Nov. 2, 1937.  L. W. CAULK, JR  2,097,965
TAG FASTENER
Filed Dec. 29, 1936
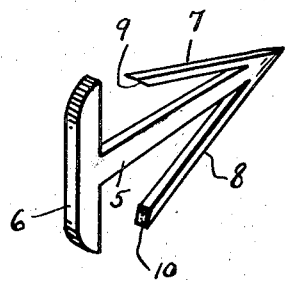
Inventor
*L. W. Caulk, Jr.*
By *Clarence A. O'Brien*
*Hyman Berman*
Attorneys

Patented Nov. 2, 1937

2,097,965

UNITED STATES PATENT OFFICE 2,097,965

TAG FASTENER

Luther W. Caulk, Jr., Suffolk, Va.

Application December 29, 1936, Serial No. 118,130

1 Claim. (Cl. 40—22)

My invention relates generally to means for fastening tags to bags and the like, and particularly to a fastener adapted to attach designating tags to fabric bags such as those utilized to contain and ship poultry and animal foods, and an important object of my invention is to provide a fastener of this character which is efficient and serviceable, and which will pass muster in certain of the States of the United States wherein the use of metal tag fasteners on such containers is prohibited.

Another important object of my invention is to provide a fastener of the character indicated which is of non-metallic material, but which may be made of metal where the use of a metal tag is permitted or desirable.

Other important objects of my invention will be apparent from a reading of the following description taken in connection with the drawing, wherein for purposes of illustration I have shown a preferred embodiment of my invention.

In the drawing:—

The single view is a perspective view of an embodiment of the invention.

The tag fastener embodying the present invention is preferably made of compressed paper, cardboard, wood pulp, fiber, rubber, and metals. The non-metallic fasteners are particularly adapted to be used to fasten tags to poultry and animal food containing bags and sacks, while the metallic form as well as the non-metallic form of fastener is adapted to use with bags and sacks and containers for other commodities. If desired, the fasteners may be made of such materials that even though the fastener be introduced into the stomach of the poultry or animals consuming the food in the container, no harm will result.

Referring in detail to the drawing, a preferred embodiment of the invention comprises a shank 5 which is relatively narrow and elongated and may be either rigid or flexible without being too flexible for support purposes. At one end of the shank 5 is the cross-head 6 which is of a suitable transverse dimension to retain a tag (not shown) on the shank when the shank is passed through the eye of the tag. Different shapes may be given to the head 6 according to the particular use.

On the opposite end of the shank 6 are the twin barbs 7, 8 which are flexible in character or are flexibly connected to the said end of the shank to enable them to compress toward the shank when this end of the shank is passed through the eye of the tag and through the mesh of the fabric of the bag or sack or other container; so that the barbs 7 and 8 upon being freed from the mesh or other small opening through which the shank is passed, will return to their original positions wherein the outward ends of the barbs will engage the opposite side of the fabric or the like and positively retain the fastener fastened to the bag or sack or the like. The outer ends of the barbs may be sharpened by beveling one side thereof as indicated by the respective numerals 9 and 10 to give a better purchase for the barbs on the material of the bag or sack.

In utilizing the device of the invention the barbed end of the shank is passed through the opening in the tag and then the barbed end of the shank is pushed through the mesh of the fabric of which the bag or sack is made. As soon as the passage of the barbs through the fabric has been completed, they will of their own nature spring outwardly to their original condition and act as barbs positively preventing withdrawal of the fastener from the bag. The cross-head 6 positively retains the tag on the shank 5.

Although I have shown and described herein a preferred embodiment of my invention, it is to be definitely understood that I do not desire to limit the application of the invention thereto, and any change or changes may be made in the materials, and in the structure and arrangement of the parts, within the spirit of the invention and the scope of the subjoined claim.

What is claimed is:—

A fastener for insertion into the eyelet of a tag comprising a flat shank of resilient material having integral with one end thereof a single pair of relative long and narrow barbs upon opposite sides of said shank, respectively, whereby said barbs are flexible for compression inwardly during the passage thereof through said eyelet, the opposite end of said shank being T-shaped to provide a combined head and finger grip portion.

LUTHER W. CAULK, Jr.